Feb. 26, 1957 W. P. RALSTON ET AL 2,783,003
AIRCRAFT ENGINE INSTALLATION
Filed Oct. 16, 1951 2 Sheets-Sheet 2
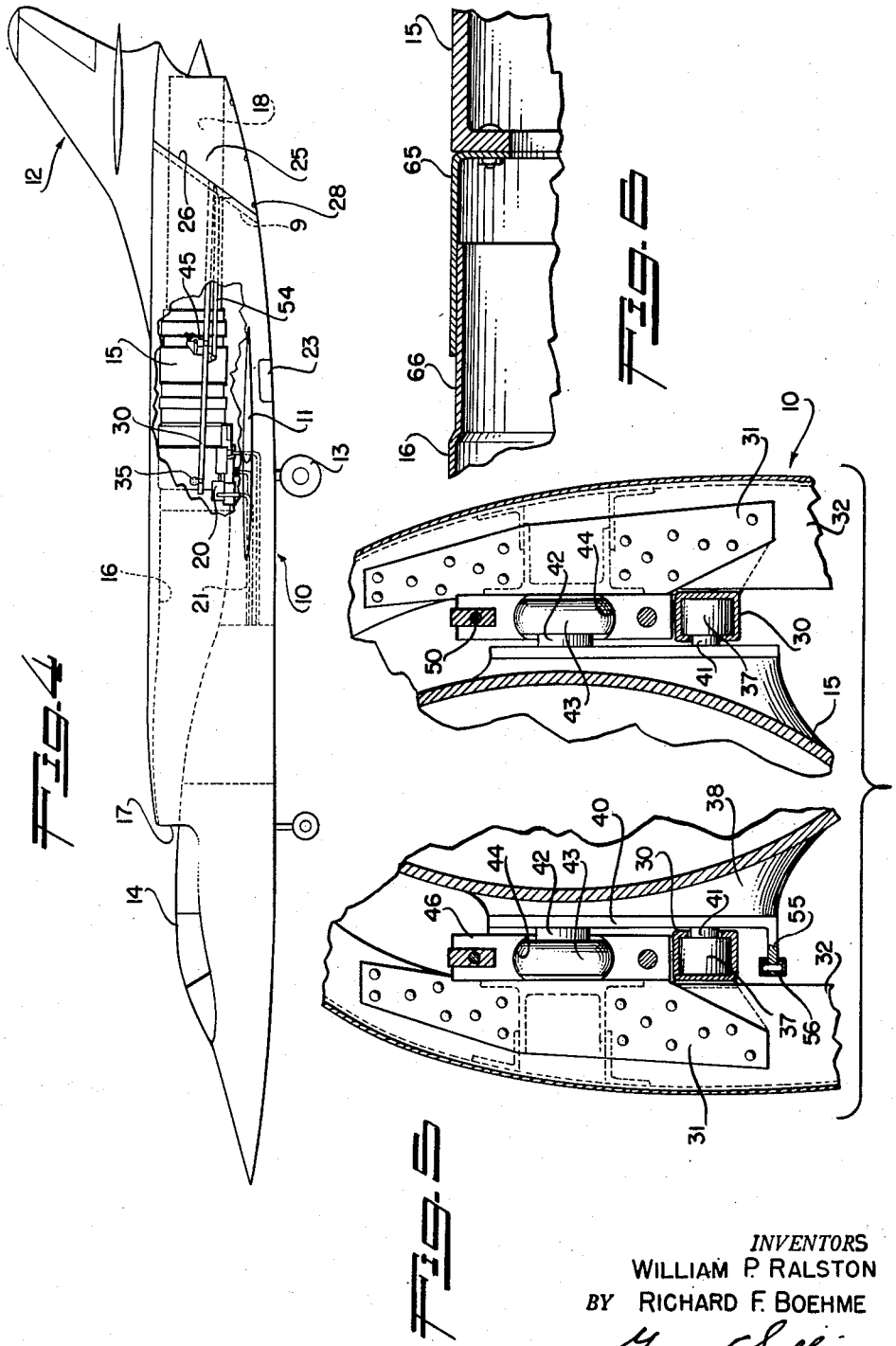
INVENTORS
WILLIAM P. RALSTON
BY RICHARD F. BOEHME
Agent

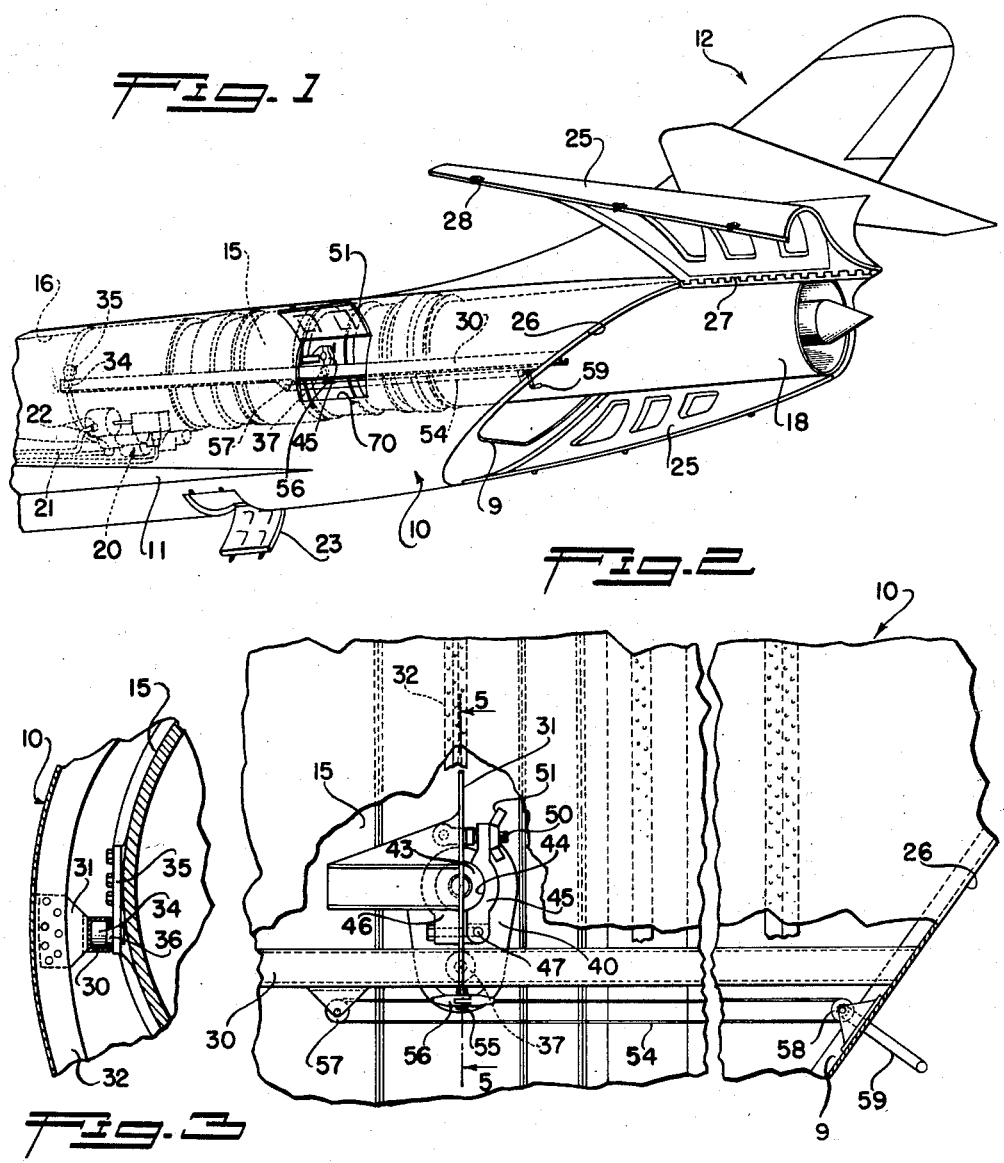

United States Patent Office 2,783,003
Patented Feb. 26, 1957

2,783,003

AIRCRAFT ENGINE INSTALLATION

William P. Ralston and Richard F. Boehme, Los Angeles, Calif., assignors to Lockheed Aircraft Corporation, Burbank, Calif.

Application October 16, 1951, Serial No. 251,492

4 Claims. (Cl. 244—54)

This invention relates to engine arrangements or installations and relates more particularly to the installing of turbo type power plants in aircraft.

The gas turbine power plants of aircraft require frequent servicing, inspection and replacement, making it necessary to provide for the ready installation and removal of the engines. Where this type of engine is housed within the fuselage of the airplane the installation and removal presents serious problems. At present, there are three general ways of installing the engines in such situations; (I) The aft section of the fuselage together with the empennage, is detached and removed to permit the engine to be installed. This necessitates special handling equipment for the detachable aft section of the airplane, requires "breaking" or disconnecting major airframe structure and necessitates the uncoupling of surface controls etc. (II) The engine is installed and lifted out through an access opening in the top of the fuselage by means of a crane or the like. This method requires the provision of an excess opening considerably larger than the engine with accompanying complications of the air-frame structure, and necessitates the use of a large costly crane. (III) The engine is raised and lowered vertically through a large access opening in the bottom of the fuselage by means of a lift truck, capable of reaching up through the access opening. Thus the present methods of installing and removing the engines necessitate either the disconnection and reattachment of major airframe parts and functional controls with the attendant complications and disadvantages or the provision of a large vertical access opening in the fuselage and the use of expensive cumbersome ground handling equipment to raise and lower the engine through the opening.

It is a general object of the present invention to provide a simple practical and inexpensive means for mounting a turbo type engine in the fuselage of an airplane that avoids the difficulties and disadvantages of the present engine installations or mounting means.

Another object of the invention is to provide an engine installation of this kind that does not necessitate the disconnection or uncoupling of major airframe components, surface controls, or the like, upon installing or removing the engine. In accordance with the invention, the engine is entered through and removed from the aft end of the fuselage which is a portion of the airplane not required to assume any major operational loads and therefore it may be equipped with an access opening of adequate size without weakening the general structure. Furthermore as the engine is installed and removed, by moving it longitudinally along its major axis and fore and aft of the fuselage, the access opening may be of minimum dimensions and none of the major bulkheads, or the like, of the airframe need be interrupted or cut through to provide the access opening. In practice the access opening is closed by doors which are simply fairings for the aft extremity of the fuselage. Another object of the invention is to provide an engine installation of this character that avoids the need for heavy expensive cranes, lift trucks or the like. In accordance with the invention the engine is moved in a generally horizontal direction when being entered in and removed from the fuselage and a simple relatively light dolly or the like may be employed for this purpose.

It is a further object of the invention to provide an engine installation of the character described, incorporating a track and roller means to facilitate easy movement of the engine in the fuselage, when being installed and removed. The interior of the fuselage is equipped with fore and aft tracks and the engine has spaced rollers cooperating with these tracks to facilitate easy fore and aft movement of the engine between the normal or installed operating position and the position where it extends from the aft end of the fuselage for engagement on a truck, dolly or the like. The installation may include a winch and cable system for facilitating the movement of the engine along the tracks.

A still further object of the invention is to provide an engine installation of this type that may be designed to accommodate various different engines. The tracks with or without alteration may receive rollers provided on different makes and models of engines.

Other objectives and features of the invention will become apparent from the following detailed description of a typical preferred embodiment throughout which reference will be made to the accompanying drawings, wherein:

Figure 1 is a perspective view of the aft portion of an airplane equipped with the engine installation means of the invention showing the aft access doors in the open positions.

Figure 2 is an enlarged fragmentary side elevation of a portion of the airplane with the skin thereof broken away in part to illustrate one of the tracks and associated parts.

Figure 3 is an enlarged fragmentary vertical sectional view illustrating one of the forward rollers engaged in its track.

Figure 4 is a side elevation of the airplane with a portion broken away to illustrate a part of the engine and its mounting means in elevation.

Figure 5 is an enlarged fragmentary vertical sectional view taken substantially as indicated by line 5—5 on Figure 2 illustrating the track and roller means and the engine mounting means; and Figure 6 is an enlarged fragmentary vertical sectional view showing the connection between the inlet or forward end of the engine and the air duct of the airplane.

The invention may of course be incorporated in aircraft of various types and designs. Thus while we have shown the invention employed to mount or install an engine in the particular airplane illustrated in the drawings this is not to be construed as limiting or restricting the application of the invention. The airplane illustrated has a fuselage 10, wings 11, an empennage 12, landing gear 13, and a cockpit 14. The powerplant or engine 15, which is of the turbo type is housed within the fuselage 10, with its longitudinal axis coincident or parallel with the fore and aft axis of the airplane. One or more air ducts 16, lead through the fuselage 10, from ram air inlet 17 to the forward air receiving end of the engine. The empennage 12 has its surfaces above the fuselage proper to be above and substantially clear of the propulsive jet produced by the engine 15. While the present invention is not directly concerned with the airframe or primary structure of the airplane, it may be observed that the empennage 12 may be carried by the aftmost major bulkheads 9, of the fuselage 10 and that these bulkheads are some distance forwardly of the rear extremity of the fuselage assembly.

The engine 15, in accordance with the usual practice, is an elongate generally cylindrical structure having a tail pipe 18. This tail pipe 18 may or may not incorporate an after burner to increase the thrust output. As will be seen from an inspection of Figures 1 and 4 the tail pipe 18 has its nozzle or rear extremity adjacent the rear extremity of the fuselage 10. The engine 15 is of course provided with accessories 20 in the form of pumps, generators etc. These accessories 20 may be positioned as desired in the fuselage 10. In the particular case illustrated the accessories 20 are below the forward portion of the engine 15 and the various lines 21 leading to and from the accessories preferably have readily disconnectable fittings or connectors 22 as is the general practice to permit removal of the engine from the airplane. The accessories 20, and their connectors 22, may be made readily accessible through an access opening or door 23 in the fuselage 10.

The invention provides doors 25 for the aft portion of the fuselage 10. As best shown in Figure 1, the aft end of the fuselage proper terminates at a downwardly and forwardly inclined plane 26 and the doors 25 serve to fair in the airplane around the tail pipe 18 of the engine 15 from this plane 26 rearwardly to approximately the plane of the tail pipe nozzle. The upper edges of the doors 25 are secured to the airplane at the lower part or base of the empennage 12 by hinges 27 so as to be swingable or movable from the closed position of Figure 4 to the open position of Figure 1, the mounting means for the doors preferably being such that the doors may be removed from the airplane if desired. The forward edges of the doors 25 slope downwardly and forwardly to mate with the terminal plane 26 of the fuselage 10 and the doors are curved or arcuate in cross section to be of clam shell shape. The lower edges of the doors 25 are adapted to engage, mate or overlap when the doors are closed and suitable spaced latches 28 are provided along these edges to hold the doors in the closed position of Figure 4. The rear or aft ends of the doors 25 may be straight or contoured to complete the aft end configuration of the empennage portion of the airplane. It will be seen that when the doors 25 are opened as in Figure 1, the aft end of the fuselage 10 is open and unobstructed to freely receive engine 15 or to permit the engine to be withdrawn rearwardly from the fuselage.

The invention further includes tracks 30 in the fuselage 10 to support or to assist in supporting the engine 15, and to facilitate installation and the withdrawal of the engine. There is a track 30 provided at each side of the engine 15, the tracks being fixed to plates 31, or the like, which in turn are fixed to the bulkheads 32 of the fuselage 10. The tracks 30 are directly opposite and extend forwardly from the aft end 26 of the fuselage to adjacent the forward end of the engine 15. The tracks 30 are preferably parallel one with the other, and extend in the fore and aft direction. While the design of the particular airplane may require them to be otherwise, the tracks 30 are preferably generally horizontal when the airplane is supported by its landing gear as illustrated. The two tracks 30 are arranged to occupy a plane spaced a short distance below the central horizontal plane of the powerplant 15. In accordance with the broader aspects of the invention the tracks 30 may be of any selected type or configuration. In the case illustrated in the drawings the tracks 30 are channel like parts of substantially rectangular cross section having partially open webs facing inwardly or toward powerplant 15.

The means for facilitating the installation or removal of engine 15 further includes rollers 34, on the forward end part of the engine 15. There is a plate 35 or the equivalent secured on each side of the engine 15 adjacent its forward end, and shafts or pins 36 on these plates rotatably support the rollers 34. The rollers 34 operate in the tracks 30, the pins 36 passing through the open sides or webs of the tracks. A second pair of rollers 37 is provided on the engine 15 to operate in the tracks 30. Mounting pads or bosses 38 are formed on each side of the engine 15, adjacent the transverse plane occupied by its center of gravity, and plates 40 are fixed on these bosses. Pins or shafts 41 project from the plates 40, and rotatably carry the rollers 37, the pins being adapted to extend through the open sides of the tracks 30. The aft ends of the tracks 30 are open to first receive the rollers 34 upon introduction of the engine into the fuselage 10, and to then receive the rollers 37, whereby the engine is free for fore and aft movement in the fuselage.

Engine mounts are provided to definitely but releasably secure the engine 15 in the fuselage 10 and to transmit the power or thrust from the engine to the airplane. The mounts illustrated in the drawings include studs 42, projecting from the mounting pad plates 40 and carrying partially spherical heads 43. These heads 43 seat in correspondingly shaped recesses 44, formed between pairs of blocks 45 and 46. The blocks 46 are fixed in the fuselage 10 for example they may be fixed on the plates 31. The blocks 45 are hinged or pivoted to their companion blocks 46 at 47 and are adapted to be swung downwardly to inactive positions to allow the heads 43 to be engaged against the blocks 46 when the engine is moved into position. In this connection it will be noted that the blocks 46 form positive stops for limiting inward or forward travel of the engine 15 and serve to properly position the engine in the fuselage 10. When the engine 15 has been arranged with the heads 43 against the blocks 46, the blocks 45 are swung upwardly against the heads and are secured to the blocks by hinged screws 50 carrying clamp nuts 51. Prior to removing the engine 15, the nuts 51 are loosened and the screws 50 are swung upwardly to release the blocks 45. The blocks 45 are then swung downwardly to permit the engine 15 to be moved along the tracks 30. It is to be understood that the engine mounting means just described assumes all of the primary engine loads and thrusts, relieving the rollers 34 and 37 and the tracks 30 of such loads. In this connection it should be noted that the rollers 34 and 37 have some vertical clearance in the tracks 30 so that the mounting means may assume the operational loads. Access openings 70 are provided in the sides of the fuselage 10 to give access to the engine mounting means just described, and the associated or adjacent parts, and are normally closed by doors 51.

If desired, or in certain installations, pulley and cable means are provided to move or to aid in moving the engine 15 along the tracks 30 for the installation and removal of the engine. This means includes a cable 54 having its opposite ends secured to a lug 55 on one of the mounting plates 42. Clips 56 may be employed to permit quick connection and disconnection of the cable 54 with the lug 55. The cable 54 passes forwardly over a direction changing pulley 57 mounted below the adjacent tracks 30, then extends rearwardly to a drum or pulley 58 and then back to the lug 55. The pulley 58 is mounted in the rear of the fuselage 10 and may be operated or rotated by a hand crank 59 or the equivalent. The cable 54 has several turns on the pulley 58 so that rotation of the crank 59 serves to move the engine 15 either fore or aft along the tracks depending upon the direction of the rotation.

As previously described, the air intake duct 16 leads to the forward end of the engine 15. Figure 6 illustrates a simple attachment or coupling that may be employed to connect the duct 16 and the inlet end of the engine 15. This attachment includes a tubular extension or member 65 secured to the forward end of the engine 15 and adapted to slidably or frictionally receive a slightly reduced portion 66 on the rear end of the duct 16. When the engine 15 is moved into place in the fuselage 10, the member 65 slides or engages over the duct portion 66 so that the duct 16 directly delivers the ram air to the engine. Upon withdrawing the engine 15 from the fuselage the member 65 slides or pulls free of the duct portion 66.

It is believed that the features and operation of the engine installation of the invention will be readily understood from the foregoing detailed description. Prior to installing the engine 15 the doors 25 are opened or raised to the positions shown in Figure 1. The engine 15 which may be supported on a truck, dolly, or the like, is then brought into the position where its forward end enters the aft end of the fuselage and the forward rollers 34 are entered in the tracks 30. The engine 15 is then moved forwardly, the rollers 34 and tracks 30 assisting in guiding the engine as it is advanced into the fuselage. With the engine 15 partially introduced into the fuselage 10 the rear or second set of rollers 37 is entered in the open aft ends of the tracks 30 and the forward motion of the engine is continued until the heads 43 of the engine mounting studs 42 engage against blocks 46. The cable and crank means 54—59 may be used to move the engine forwardly. During the final forward motion of the engine 15 the above described member 65 will have slid over the duct portion 66 to connect the engine with the air intake duct 16. With the engine in its final position the blocks 45 are swung upwardly and secured in place against the heads 43 by the screws 50 and their nuts 51. The installation of the engine may be completed by connecting up the several lines 21 of the accessories 20 etc. by means of their connectors 22. With the engine installed the doors 25 are swung downwardly and secured in place by the latches 28. This may complete the installation of the engine. When it becomes necessary to remove the engine 15 from the fuselage 10 for inspection, servicing or replacement, the lines 21 and any other lines connected with the powerplant are disconnected and the doors 25 are raised to their position illustrated in Figure 1. The nuts 51 are loosened and the blocks 45 are swung downwardly to their released position to free the engine for rearward withdrawal from the fuselage. The engine 15 may be moved rearwardly by means of the cable and crank system 54—59 or by other means, the rollers 34 and 37 freely operating along the tracks 30 to facilitate the rearward withdrawal of the engine. The engine is simply moved rearwardly from the aft end of the fuselage onto an appropriate dolly or truck, it being unnecessary to employ special hoists, cranes or other cumbersome ground handling equipment. It will be seen that the invention greatly simplifies the installation and removal of the engine from the airplane, avoids the necessity for using expensive cumbersome cranes, or the like, and obviates detachment of the aft section of the airplane as was often formerly done to give access to the engine.

Having described only typical preferred embodiments and applications of the invention, we do not wish to be limited to the specific details set forth, but wish to reserve to ourselves any features or modifications that may fall within the scope of the claims.

We claim:

1. In combination with a turbo engine and an airplane fuselage for containing the engine; the combination of doors movably mounted on the fuselage to be movable between closed positions where they form a fairing at the aft end of the fuselage constituting a rearward extension of the fuselage and open positions where the aft end of the fuselage is open for the reception and withdrawal of the engine, tracks attached to the interior of the fuselage at the sides thereof and extending forwardly from the aft end of the fuselage, rollers mounted on the sides of the engine and engageable with the tracks to support the engine for movement into and out of the fuselage, and means in the fuselage for moving the engine along the tracks.

2. In combination with a turbo engine and an airplane fuselage for containing the engine; the combination of doors movably mounted on the fuselage to be movable between closed positions where they form a fairing at the aft end of the fuselage constituting a rearward extension thereof and open positions where the aft end of the fuselage is open for the reception and withdrawal of the engine, tracks attached to the interior of the fuselage at the sides thereof and extending forwardly from the aft end of the fuselage, rollers mounted on the sides of the engine and engageable with the tracks to support the engine for movement into and out of the fuselage, and cable and pulley means in the fuselage for moving the engine fore and aft along the tracks.

3. In combination with a jet propulsion engine having a nozzle for ejecting a propulsive jet; an airplane including a fuselage for housing the engine and having an open aft end, an empennage on the upper aft portion of the fuselage, the engine being insertable and removable through the aft end of the fuselage, track means in the aft portion of the fuselage for facilitating fore and aft movement of the engine into and out of the fuselage, and doors hinged to the aft portion of the fuselage below the empennage and movable between closed lowered positions where they fair about the nozzle portion of the engine and close the aft end of the fuselage and open raised positions where the aft end of the fuselage is open to allow the engine to be inserted and removed, the doors when in the closed position defining an opening around said nozzle.

4. In an airplane, a fuselage terminating at its aft end in a downwardly and forwardly pitched terminal edge, there being an opening in said aft end of the fuselage, a reactive propulsion engine in the fuselage having a nozzle portion extending rearwardly through said opening, an empennage on the fuselage extending rearwardly from the upper end of said terminal edge, doors hinged to the empennage to be movable between raised open positions where said opening is substantially unobstructed and lowered closed positions where they fair around said nozzle portion and constitute a rearward extension of the fuselage, the doors having downwardly and forwardly pitched forward edges which lie parallel with and adjacent to said edge when the doors are in said closed positions.

References Cited in the file of this patent

UNITED STATES PATENTS

| | | |
|---|---|---|
| 1,641,306 | Valkenberg | Sept. 6, 1927 |
| 1,648,875 | Griese | Nov. 8, 1927 |
| 1,836,319 | Gehrung | Dec. 15, 1931 |
| 2,209,001 | Pepper | July 23, 1940 |
| 2,425,498 | Watter | Aug. 12, 1947 |
| 2,504,422 | Johnson | Apr. 18, 1950 |
| 2,584,961 | Beck | Feb. 5, 1952 |

FOREIGN PATENTS

| | | |
|---|---|---|
| 724,547 | France | Apr. 28, 1932 |
| 955,254 | France | Jan. 9, 1950 |

OTHER REFERENCES

Jane's All The World's Aircraft, 1948, page 140C.